(12) United States Patent
Kinugasa

(10) Patent No.: US 7,990,461 B2
(45) Date of Patent: Aug. 2, 2011

(54) FOCUS DETECTION DEVICE

(75) Inventor: Tomohisa Kinugasa, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 658 days.

(21) Appl. No.: 12/029,900

(22) Filed: Feb. 12, 2008

(65) Prior Publication Data

US 2008/0205872 A1  Aug. 28, 2008

(30) Foreign Application Priority Data

Feb. 27, 2007 (JP) ................. 2007-047195

(51) Int. Cl.
*H04N 5/232* (2006.01)
(52) U.S. Cl. .......... 348/350; 348/294; 348/297
(58) Field of Classification Search ........ 348/222.1
See application file for complete search history.

(56) References Cited

U.S. PATENT DOCUMENTS

| | | | | |
|---|---|---|---|---|
| 4,905,033 A | 2/1990 | Ishida et al. | ......... | 354/402 |
| 5,010,409 A | 4/1991 | Ishida et al. | ......... | 358/213.19 |
| 5,097,339 A | 3/1992 | Ishida et al. | ......... | 358/213.19 |
| 5,115,321 A | 5/1992 | Ishida et al. | ......... | 358/213.19 |
| 5,144,449 A | 9/1992 | Ishida et al. | ......... | 358/213.26 |
| 5,227,834 A | 7/1993 | Ishida et al. | ......... | 354/402 |
| 5,371,567 A | 12/1994 | Ishida et al. | ......... | 354/402 |
| 5,469,239 A | 11/1995 | Ishida et al. | ......... | 354/402 |
| 5,594,501 A * | 1/1997 | Suzuki | ......... | 348/362 |
| 6,781,624 B1 * | 8/2004 | Takahashi | ......... | 348/241 |
| 2006/0238633 A1 | 10/2006 | Kinugasa et al. | ......... | 348/300 |

FOREIGN PATENT DOCUMENTS

| | | |
|---|---|---|
| JP | 63-168613 | 7/1988 |
| JP | 2000-180706 | 6/2000 |
| JP | 2005-300756 | 10/2005 |
| JP | 2005300756 A * | 10/2005 |
| JP | 2006-301341 | 11/2006 |

* cited by examiner

*Primary Examiner* — Nicholas G Giles
*Assistant Examiner* — Yih-Sien Kao
(74) *Attorney, Agent, or Firm* — Fitzpatrick, Cella, Harper & Scinto

(57) ABSTRACT

Both of a high speed AF using contrast control and a high precision AF using a color temperature sensor are achieved. A focus detection device has: a first sensor which outputs a signal for a focus detection by detecting a phase difference; and a second sensor having a plurality of pixels whose spectral sensitivities are different. Accumulation start timing of the first sensor and that of the second sensor are different. The first sensor controls an accumulation time period and a readout gain based on a difference between the maximum and minimum values of an accumulation signal. The accumulation of the second sensor is finished in a timing when the accumulation of the first sensor is finished.

14 Claims, 10 Drawing Sheets

FOCUS DETECTION DEVICE

BACKGROUND OF THE INVENTION

1. Field of the Invention

The present invention relates to a focus detection device for an autofocus which is used in a single-lens reflex camera or the like.

2. Description of the Related Art

As a focus detection device for an autofocus, there is a passive system in which luminance information of an object is received by a photosensor and a focal position is detected by an electric process. A phase difference detection system in the passive system is a system in which a lateral deviation of luminance signals in two sets of photosensitive elements is detected.

In the autofocus (hereinbelow, referred to as an AF) of the phase difference detection system which is used in a single-lens reflex camera, there is such a problem that a focus detecting position differs depending on a color temperature of an object light source. Such a problem occurs by a color aberration of a lens as a cause. An example of a focus detection device which can solve such a problem has been disclosed in Patent Document 1 (Japanese Patent Application Laid-Open No. S63-168613).

The device has an AF sensor for detecting a focal point and a color temperature sensor and has a correcting unit for correcting an output of the AF sensor based on an output of the color temperature sensor. A photosensor array of the AF sensor and a pair of photodiodes of the color temperature sensor are adjacently arranged in an AF sensor module.

There is an example as disclosed in Patent Document 2 (Japanese Patent Application Laid-Open No. 2005-300756) in which automatic gain control is provided for the focus detection device having the AF sensor and the color temperature sensor in order to improve characteristics of each sensor.

It is demanded to realize a high AF speed owing to the improvement of a camera frame speed or the like. As a method of realizing the high AF speed, there is a method whereby a difference between the maximum value and the minimum value of the sensor output is detected and accumulation control of the AF sensor is made (hereinbelow, such a method is referred to as contrast control). By using such contrast control, even when a luminance of the object is low, if a contrast is sufficient, the accumulation is finished in a short time and the high speed AF can be performed.

As an example of the contrast control AF, there is Patent Document 3 (Japanese Patent Application Laid-Open No. 2000-180706).

Therefore, in the present AF, it is demanded to realize a high precision using the color temperature sensor and the like and a high speed using the contrast control or the like.

However, in Patent Documents 1 and 2, nothing is disclosed about the realization of the high speed by the contrast control. In Patent Document 3, although the contrast control is used for the accumulation control of the AF sensor, there is a possibility that the AF speed cannot be improved depending on the object.

This is because of the following reasons. In the object of a low luminance and a high contrast, the accumulation of the AF sensor is finished relatively in a short time due to the contrast control. As for the color temperature sensor, the maximum value of the sensor output is detected and accumulation control is made (hereinbelow, such control is referred to as peak control). Therefore, in the case of the object of the low luminance, an accumulation time period becomes long. Since outputs of both of the AF sensor and the color temperature sensor are necessary for the AF operation, the AF speed is eventually limited by the accumulation time period of the color temperature sensor.

SUMMARY OF THE INVENTION

It is, therefore, an object of the invention that when the AF operation of a high precision using a color temperature sensor output is executed, both of a high speed AF using contrast control and a high precision AF using the color temperature sensor output are achieved even in the case of an object of a low luminance and a high contrast.

To accomplish the above object, according to the invention, there is provided a focus detection device comprising: a first sensor which outputs a signal for a focus detection by detecting a phase difference; and a second sensor having a plurality of pixels whose spectral sensitivities are different, wherein accumulation start timing of the first sensor and accumulation start timing of the second sensor are different, the first sensor controls an accumulation time period and a read-out gain based on a difference between a maximum value and a minimum value of an accumulation signal, and the accumulation of the second sensor is finished in a timing when the accumulation of the first sensor is finished.

Further features of the present invention will become apparent from the following description of exemplary embodiments with reference to the attached drawings.

DESCRIPTION OF THE EMBODIMENTS

Exemplary embodiments of the invention will be described hereinbelow with reference to the drawings.

In all of the embodiments, a color temperature sensor in a focus detection device is used for correcting a color aberration of an AF sensor.

Embodiment 1

Figure 1:
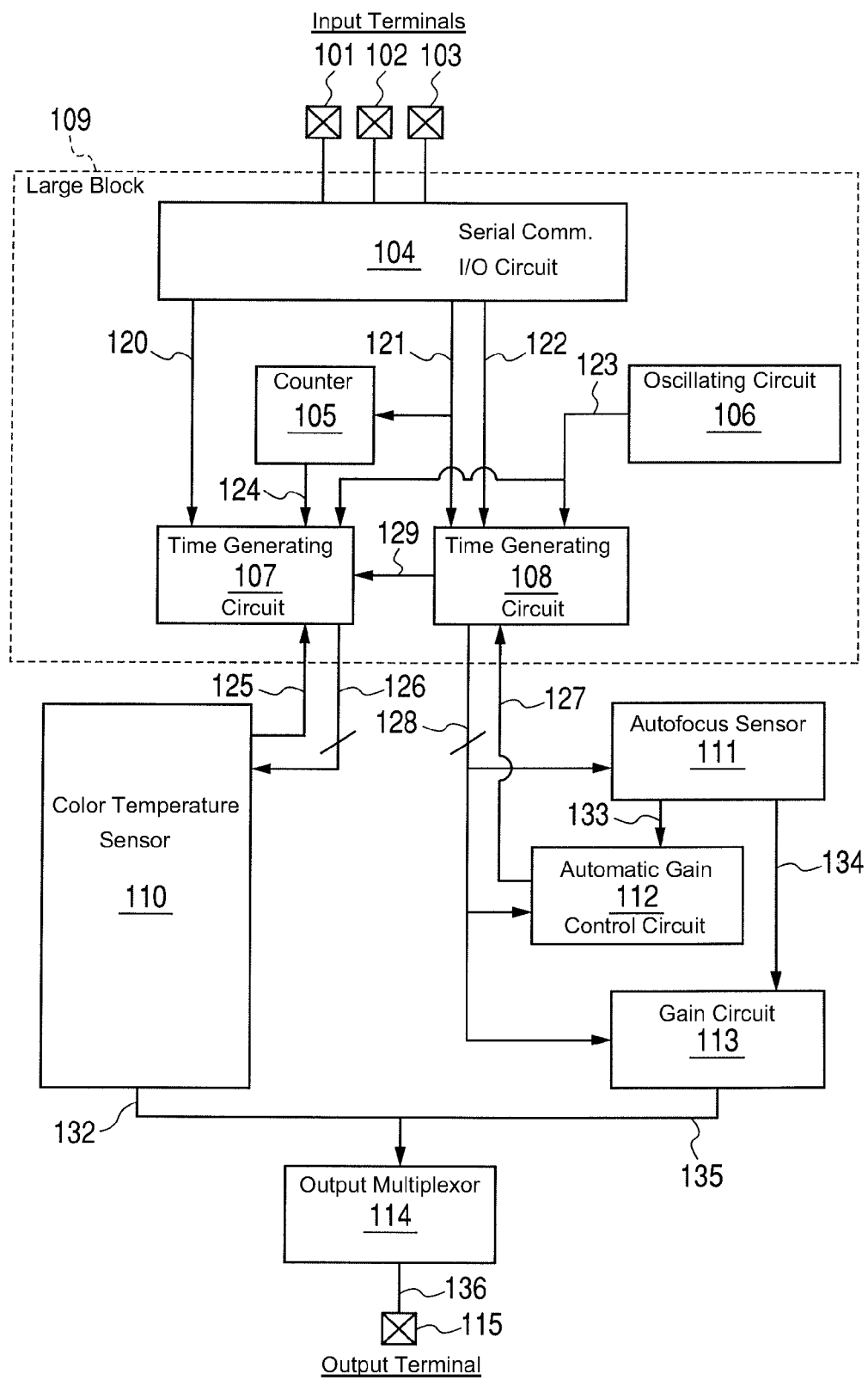
FIG. 1 is a circuit block diagram illustrating the embodiment 1 of the invention.

FIG. 1 is a circuit block diagram illustrating the embodiment 1 of the invention.

There are provided: a serial communication clock input terminal 101; a serial communication enable signal input terminal 102; a serial communication data input terminal 103;

a serial communication I/O circuit 104; a counter circuit 105 for delaying an input signal by a predetermined time period and outputting; an oscillating circuit 106 for forming a master clock of a logic circuit; a timing generating circuit (hereinbelow, abbreviated to TG) 107 for a color temperature sensor; and a TG 108 for an AF sensor. Those component elements construct a logic block 109.

A color temperature sensor (second sensor) 110 has a plurality of pixels whose spectral sensitivities are different. An AF sensor (first sensor) 111 outputs a signal for a focus detection by detecting a phase difference. One AF line is formed by tens of pixel arrays and corresponds to one distance measuring point. Details have been disclosed in Patent Document 3 mentioned above. There are also provided: an automatic gain control (AGC) circuit 112; a gain circuit 113; an output multiplexer 114; and an analog signal output terminal 115.

There are also provided: a forced accumulation end signal 120 of the color temperature sensor; an AF correcting operation start signal 121; a forced accumulation end signal 122 of the AF sensor; a main clock 123; an accumulation start signal 124 of the color temperature sensor; an accumulation completion signal 125 of the color temperature sensor; a driving signal 126 of the color temperature sensor 110; an accumulation completion signal 127 of the AF sensor; and a driving signal 128 of the AF sensor 111, AGC circuit 112, and gain circuit 113.

There are also provided: an accumulation end signal 129 of the color temperature sensor; an output signal 132 of the color temperature sensor; a maximum signal and a minimum signal 133 of the AF sensor; a maximum signal, a minimum signal, and a bit signal 134 of the AF sensor; an output signal 135 of the AF sensor; and an analog output signal 136.

The driving signals 126 and 128 indicate a plurality of control signals. The color temperature sensor driving signal 126 transfers accumulation start timing and accumulation end timing of the color temperature sensor 110, sampling and holding timing, and read-out timing.

The driving signal 128 transfers timing for the correcting operation, output timing of the maximum and minimum values during the accumulation, accumulation end timing, and signal read-out timing of the AF sensor 111, AGC timing of the AGC circuit 112, and read-out timing of the gain circuit 113.

Figure 5:
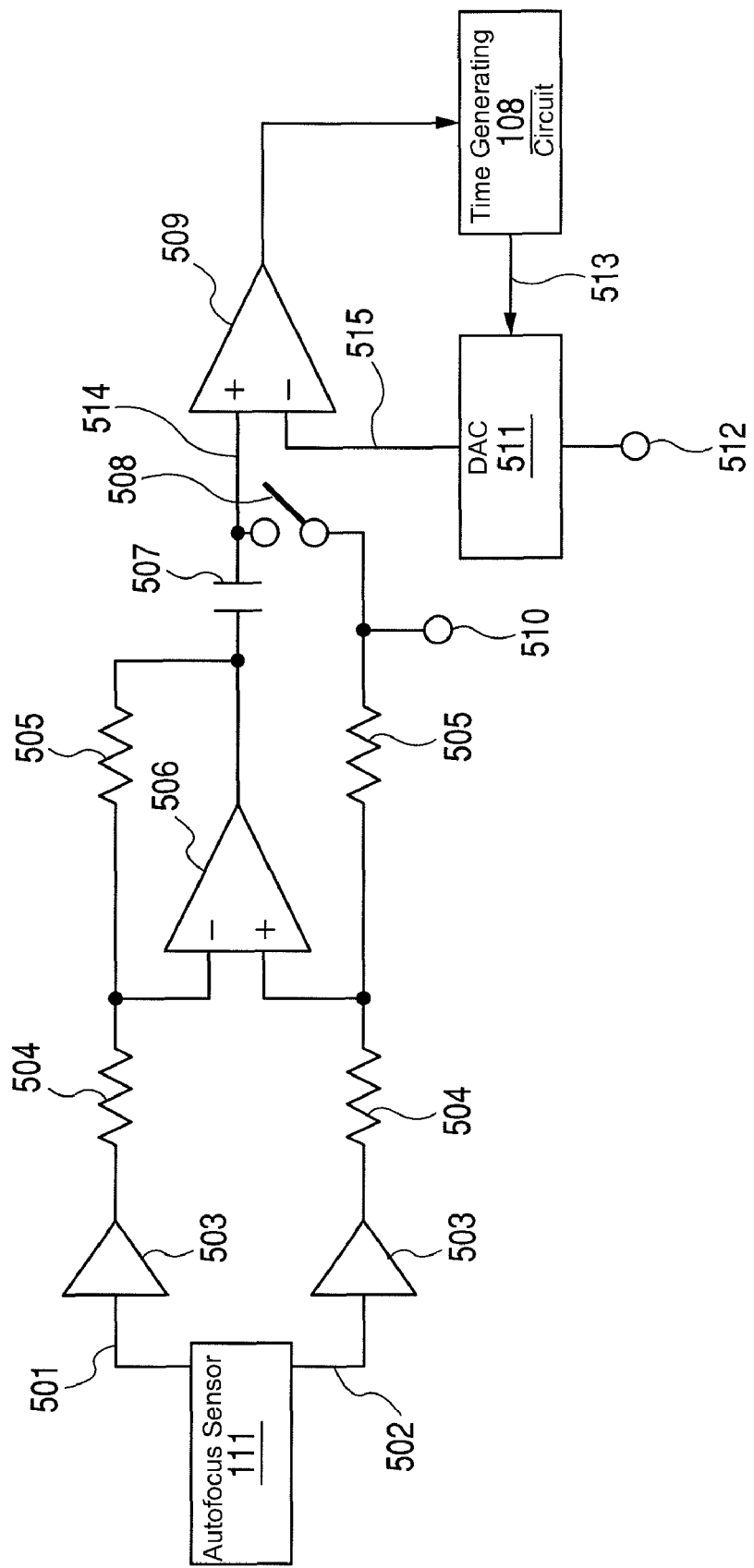
FIG. 5 is a circuit diagram of an AGC circuit illustrating the embodiment 1 of the invention.

FIG. 5 is a circuit block diagram of the AGC circuit 112 illustrated in FIG. 1.

The maximum value of the signal which is output from the AF sensor is transferred by a path 501. The minimum value of the signal which is output from the AF sensor is transferred by a path 502. There are provided: buffer amplifiers 503; first resistors 504; second resistors 505; an operational amplifier 506; a clamp capacitor 507; a clamp switch 508; a comparator 509; an AGC reference voltage 510; a DAC 511; a DAC reference voltage 512; a setting signal 513 for setting the accumulation time period; an accumulation monitoring signal 514 of the AF sensor; and an accumulation comparing signal 515 of the AF sensor. The clamp switch 508 and the DAC 511 are controlled by the TG 108 for the AF sensor.

The operation of the AGC circuit illustrated in FIG. 5 will be described hereinbelow. A difference signal indicative of a difference between the maximum value 501 and the minimum value 502 of the signal from the AF sensor is amplified by a gain which is determined by a ratio of a resistance value of each second resistor 505 and a resistance value of each first resistor 504 and is offset by using the AGC reference voltage 510 as a reference. An obtained value is input as an AF sensor accumulation monitoring signal 514 to the comparator 509.

Based on the DAC reference voltage 512, the DAC 511 outputs the AF sensor accumulation comparing signal 515 which is set by the setting signal 513. The comparator 509 compares the AF sensor accumulation monitoring signal 514 with the AF sensor accumulation comparing signal 515 and outputs an AF sensor accumulation completion signal to the TG 108 for the AF sensor if the former signal 514 is larger than the latter signal 515. In this manner, the accumulation time period of the AF sensor 111 is controlled based on the difference between the maximum value and the minimum value of the signal.

The output of the AF sensor is converted into a digital signal by an external A/D converter. Since an input dynamic range (D range) of the A/D converter is constant, in order to effectively use the D range of the A/D conversion, it is necessary to properly control a signal amplitude of the AF sensor. Just after the start of the accumulation of the AF sensor, the AF sensor accumulation comparing signal 515 is set so that the amplitude of the AF output is equal to a proper value when the output signal is read out at a high gain (high gain mode). After that, when the AF sensor accumulation monitoring signal 514 is larger than the AF sensor accumulation comparing signal 515, the AF sensor accumulation comparing signal 515 is set again so that the amplitude of the AF output is equal to a proper value when the output signal is read out at a low gain (low gain mode). Thereafter, when the AF sensor accumulation monitoring signal 514 again becomes larger than the AF sensor accumulation comparing signal 515, the AF sensor finishes the accumulation.

In an object of a low luminance and a low contrast, since the AF accumulation time period is long, there is such a situation that the accumulation has to be forcedly finished by external control. By making the control for starting the accumulation at the high gain as mentioned above, even if the accumulation is forcedly finished in a state of the low accumulation level, the proper AF output amplitude can be obtained. In an object with an enough contrast, since the signal is read out at a low gain, it is superior in terms of an S/N ratio.

Figure 6:
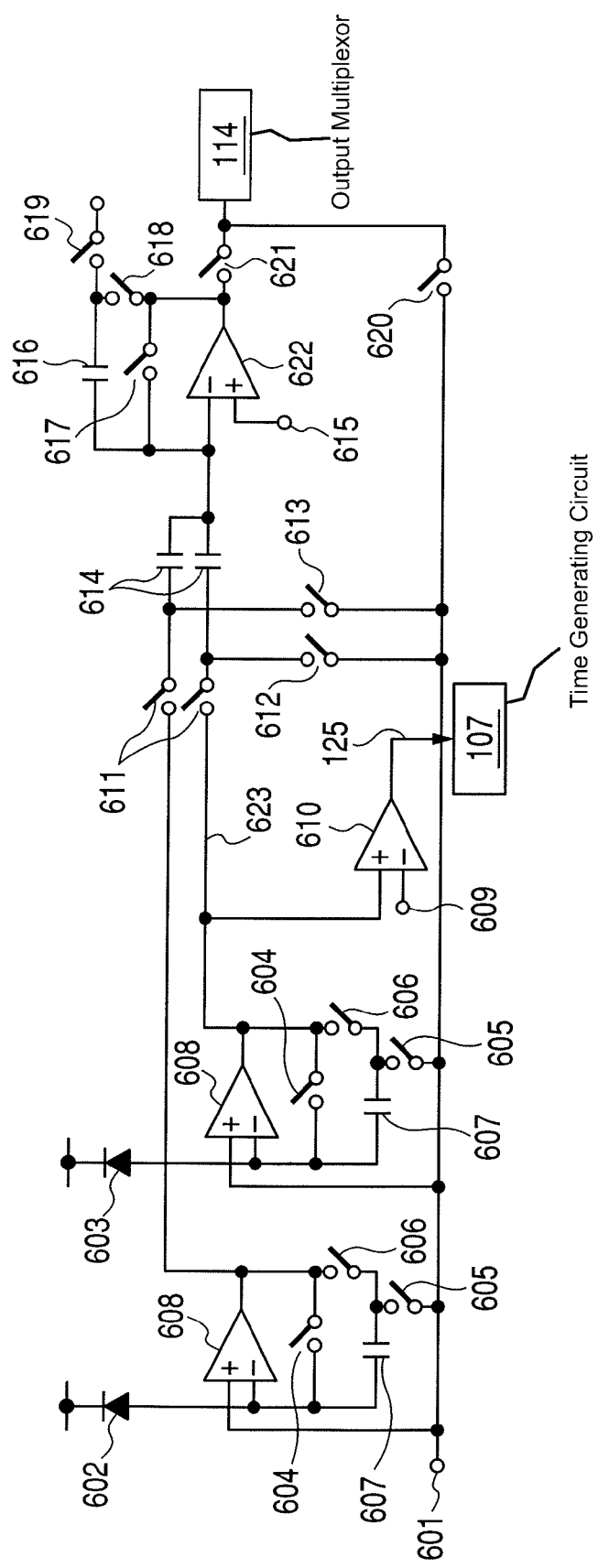
FIG. 6 is a circuit diagram of a color temperature sensor illustrating the embodiment 1 of the invention.

FIG. 6 is a circuit diagram of the color temperature sensor illustrated in FIG. 1.

Pixels 602 and 603 have different spectral sensitivities. For example, the pixel 602 is a photodiode (R pixel) in which light that has passed through a red color filter enters. The pixel 603 is a photodiode (W pixel) in which light directly enters without passing through a color filter. The accumulation monitoring signal is formed based on a signal of the W pixel. A resetting voltage (VRST) for resetting the photodiode is supplied through a terminal 601.

A resetting switch (SW1) 604 is provided to reset an integrating circuit, which will be described hereinafter. A switch (SW2) 605 is provided. One terminal of an integration capacitor 607 is fixed to the terminal VRST 601 by the switch 605 during a resetting period of time. By this operation, an offset of an integrating circuit 608 can be removed. A switch (SW3) 606 for removing the offset in a manner similar to the switch 605 is provided. A gain of the color temperature sensor is decided by the integration capacitor (C_INT) 607. Specifically speaking, an operational amplifier is used as an integrating circuit 608. A voltage (VCOMP) to decide the accumulation end is supplied through a terminal 609.

A comparator 610 compares an accumulation level monitoring signal formed based on the signal of the W pixel with an accumulation end voltage (VCOMP) 609. Switches (SW4) 611 are provided to control a conduction of an output of the integrating circuit 608. A switch (SW5_W) 612 is provided to control a signal output from the W pixel. A switch (SW5_R) 613 is provided to control a signal output from the R pixel.

Each holding capacitor (C_HOLD) 614 accumulates a signal obtained after a signal of each pixel was integrated. A reference voltage 615 is provided to decide an operation point of an operational amplifier 622. A read-out gain is decided by a second capacitor (C_GAIN) 616 based on a ratio of a capacitance value of the second capacitor 616 and a capacitance value of each first capacitor (C_HOLD) 614. A resetting switch (SW6) 617 is provided to reset charges accumulated in the second capacitor 616. An electric potential of one terminal of the gain capacitor 616 is fixed by a switch (SW7) 618 during a read-out resetting period of time. By this operation, an offset of the operational amplifier 622 can be removed. A switch (SW8) 619 for removing the offset in a manner similar to the switch 618 is provided. A switch (SW9) 620 is provided to read out an output reference level. A switch (SW10) 621 is provided to read out a signal from the operational amplifier to the outside. The operational amplifier 622 is provided. An accumulation level monitoring signal 623 of the color temperature sensor is illustrated.

Figure 7:
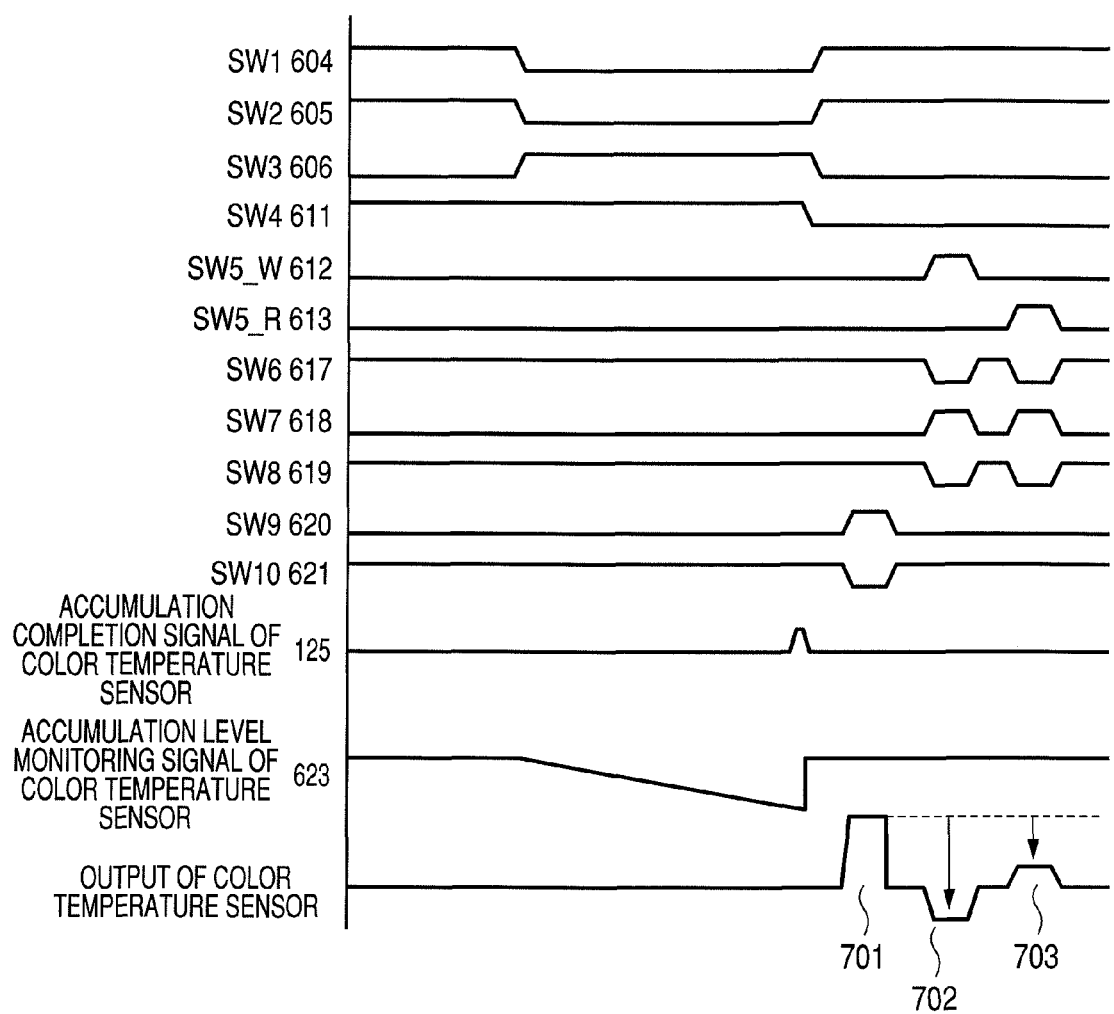
FIG. 7 is a timing chart for the color temperature sensor illustrating the embodiment 1 of the invention.

FIG. 7 is an operation timing chart for the color temperature sensor 110 in FIG. 1.

An output reference level 701 of the color temperature sensor, an output 702 of the W pixel, and an output 703 of the R pixel are illustrated. In the diagram, the same component elements as those in FIG. 6 are designated by the same reference numerals.

The operations of the AF sensor and the color temperature sensor will now be described with reference to FIGS. 1, 6, and 7.

A serial signal to start the AF correcting operation is input to each of the terminals 101, 102, and 103 in FIG. 1 from the outside. In response to the serial signal, the I/O circuit 104 outputs the AF correcting operation start signal 121. In response to the AF correcting operation start signal 121, the TG 108 for the AF sensor starts the correcting operation of the AF sensor 111. The correcting operation is an operation to remove fixed pattern noises of the AF pixel array.

During the correcting operation, the reset of the AF sensor is cancelled and the accumulation of the AF sensor is started. After completion of the correcting operation, the maximum signal and minimum signal 133 of the AF sensor are output from the AF sensor 111 to the AGC circuit 112 and the control of the accumulation time period mentioned above is started. The AF correcting operation start signal 121 is delayed by a predetermined period of time (the same period of time as that of the AF correcting operation or a period of time which has been delayed by a time corresponding to the number CLK of master clocks from the end of the correcting operation) by the counter circuit 105 and, thereafter, input as a color temperature sensor accumulation start signal 124 to the TG 107 for the color temperature sensor. When the color temperature sensor accumulation start signal 124 is received, the TG 107 for the color temperature sensor starts the accumulation of the color temperature sensor 110.

As mentioned above, the signal accumulation start timing for the AF sensor 111 and the signal accumulation start timing for the color temperature sensor 110 are different. By delaying the AF correcting operation start signal 121 by the counter circuit 105, the color temperature sensor 110 avoids an influence of an fluctuation of a power source voltage that is caused by the AF correcting operation and the stable accumulating operation can be realized.

When an accumulation start instruction is received from the TG 107 for the color temperature sensor, the color temperature sensor 110 drives the switches (SW1 to SW3) 604 to 606 so as to cancel the reset. Thus, since an input of the comparator 610 changes according to a photocurrent, when the accumulation level monitoring signal 623 of the color temperature sensor exceeds the accumulation end voltage (VCOMP) 609, the color temperature sensor 110 transmits the color temperature sensor accumulation completion signal 125 to the TG 107 for the color temperature sensor.

When the color temperature sensor accumulation completion signal 125 is received, the TG 107 for the color temperature sensor controls the switches (SW1 to SW4) 604 to 606 and 611, thereby holding the accumulation signal into the first capacitor (C_HOLD) 614 and setting the pixel into a reset state (end of accumulation of the color temperature sensor). Upon reading, the switches (SW5_W) 612, (SW5_R) 613, and (SW6 to SW10) 617 to 621 are sequentially driven. The signal held in the first capacitor (C_HOLD) 614 is amplified by a gain determined by the ratio of the capacitance value of the second capacitor (C_GAIN) 616 and the capacitance value of the first capacitor (C_HOLD) 614. The output reference level 701 of the color temperature sensor, the W pixel output 702, and the R pixel output 703 are output in time order. It is necessary to control the accumulation of the color temperature sensor by monitoring the maximum value of the output of each color. That is, the accumulation time period is controlled based on the maximum value of the accumulation signal. Although a maximum value detection circuit is generally necessary in order to detect the maximum value, since a sensitivity of the W pixel is higher than that of the R pixel, the output of the W pixel is monitored in FIG. 6.

When the accumulation in the low gain mode of the AF sensor is finished, the TG 108 for the AF sensor transmits the color temperature sensor accumulation end signal 129 to the TG 107 for the color temperature sensor. When the color temperature sensor accumulation end signal 129 is received, the TG 107 for the color temperature sensor finishes the accumulation even if the color temperature sensor 110 is executing the accumulating operation. In this manner, in the object of the low luminance and the high contrast, the AF sensor can finish the signal accumulation in a short time by utilizing the contrast control and, at the same time, finish the signal accumulation of the color temperature sensor. Thus, since a state where the accumulation time period of the color temperature sensor becomes long and the AF operation cannot be executed can be avoided, both of the high speed AF and the high precision focus detection using the color temperature sensor can be accomplished.

As another accumulation finishing unit, the color temperature sensor forced accumulation end signal 120 and the AF sensor forced accumulation end signal 122 are transmitted from the I/O circuit 104 to the TG 107 for the color temperature sensor and the TG 108 for the AF sensor by serial communication. By this method, the accumulation of the AF sensor and the accumulation of the color temperature sensor can be forcedly finished from the outside.

Embodiment 2

Figure 2:
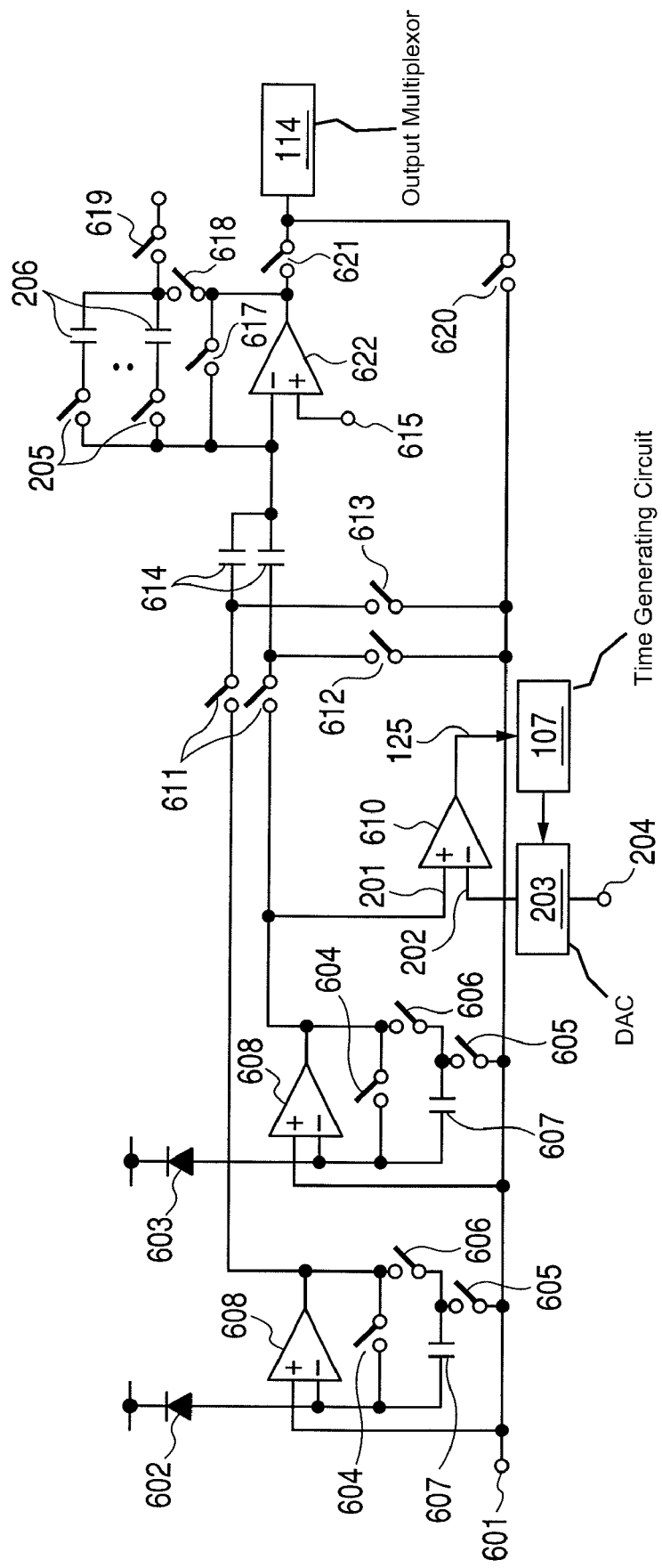
FIG. 2 is a circuit diagram of a color temperature sensor illustrating the embodiment 2 of the invention.

FIG. 2 is a circuit diagram illustrating the embodiment 2 of the invention.

In FIG. 2, there are provided: an accumulation monitoring signal 201 of the color temperature sensor; an accumulation comparing signal 202 which is used for discrimination about the accumulation of the color temperature sensor; a DAC circuit 203; a DAC reference voltage 204; read-out gain change-over switches 205; and gain capacitors 206. A description of the component elements designated by the same reference numerals as those in FIG. 6 is omitted here.

Constructions other than the construction of the color temperature sensor are substantially the same as those in the embodiment 1.

Accumulation control similar to that by the AGC circuit 112 for making the accumulation control of the AF sensor as mentioned above is performed by the DAC circuit 203, the DAC reference voltage 204, the TG 107 for the color temperature sensor, the color temperature sensor accumulation completion signal 125, and the comparator 610. That is, the accumulation is started in the high gain mode and when the accumulation progresses, the gain mode is shifted to the low gain mode. The setting of each of the read-out gains is performed by the read-out gain change-over switches 205 and the gain capacitors 206. Since the gain is determined by a ratio of a capacitance value of each gain capacitor 206 and the capacitance value of the first capacitor (C_HOLD) 614, the read-out gain value can be changed by changing the number of read-out gain change-over switches 205 which are turned on upon reading.

In the embodiment, by providing the read-out gain change-over function for the color temperature sensor, even if the accumulation time period of the color temperature sensor is short and the signal cannot be sufficiently accumulated, the output amplitude can be increased by reading out the signal at the high gain. Thus, the D range of the A/D conversion can be effectively utilized and the improvement of the S/N ratio can be realized.

Embodiment 3

Figure 3:
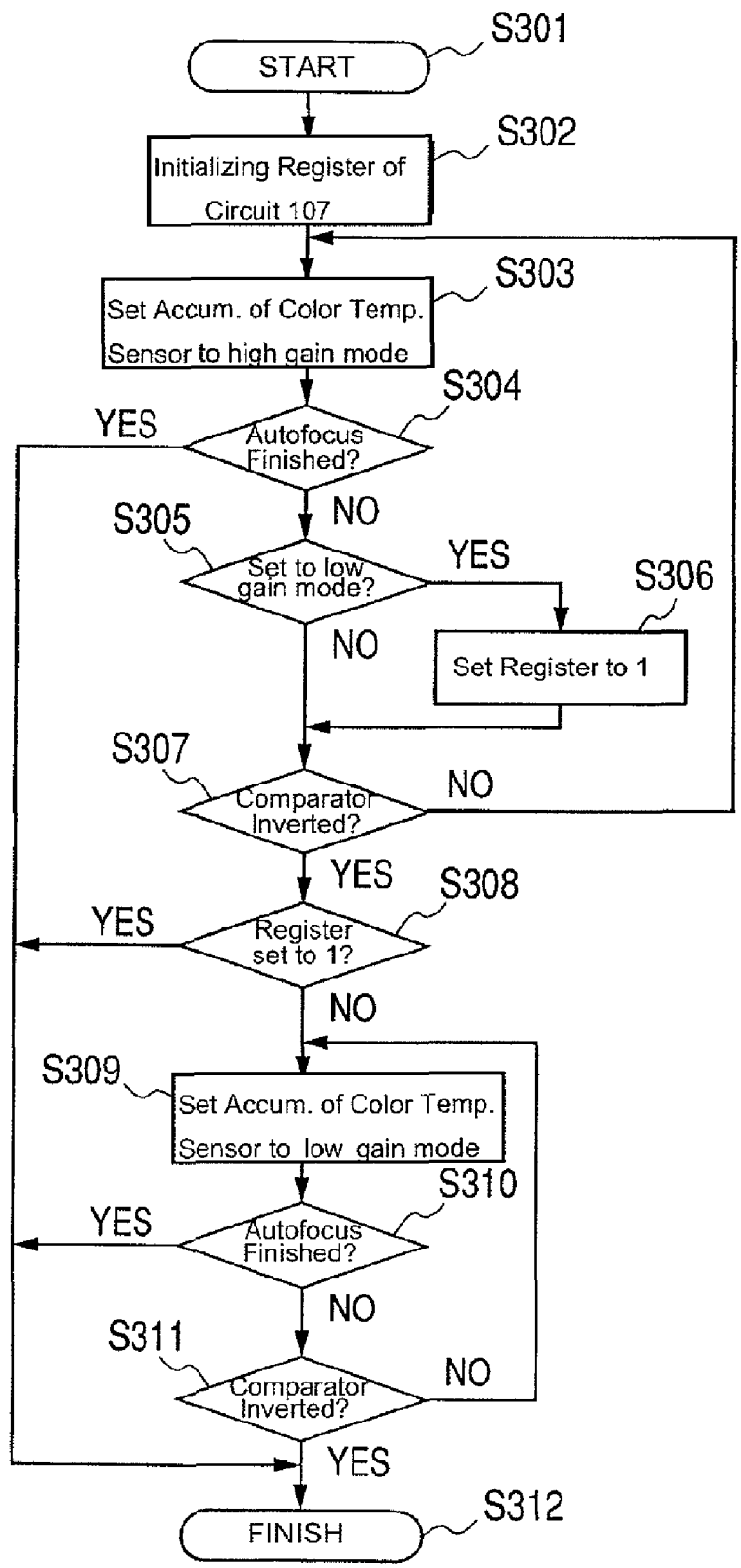
FIG. 3 is a flowchart illustrating the embodiment 3 of the invention.

FIG. 3 is a flowchart for the internal operation of the TG 107 for the color temperature sensor illustrating the embodiment 3 of the invention.

In FIG. 3, step S301 indicates "the start of the accumulation of the color temperature sensor"; S302 "the operation for initializing an internal register STOP (hereinbelow, referred to as STOP) of the TG 107 for the color temperature sensor"; and S303 "the operation for setting the accumulation of the color temperature sensor into the high gain mode".

S304 indicates "the operation for discriminating whether or not the accumulation of the AF sensor has been finished"; S305 "the operation for discriminating whether or not the AF sensor has been set to the low gain mode"; S306 "the operation for setting "1" into an internal register STOP"; and S307 "the operation for discriminating whether or not the comparator 610 has been inverted".

S308 indicates "the operation for discriminating whether or not "1" has been set in the internal register STOP"; S309 "the operation for setting the accumulation of the color temperature sensor into the low gain mode"; S310 "the operation for discriminating whether or not the accumulation of the AF sensor has been finished"; S311 "the operation for discriminating whether or not the comparator 610 has been inverted"; and S312 "the operation for finishing the accumulation of the color temperature sensor".

Figure 8:
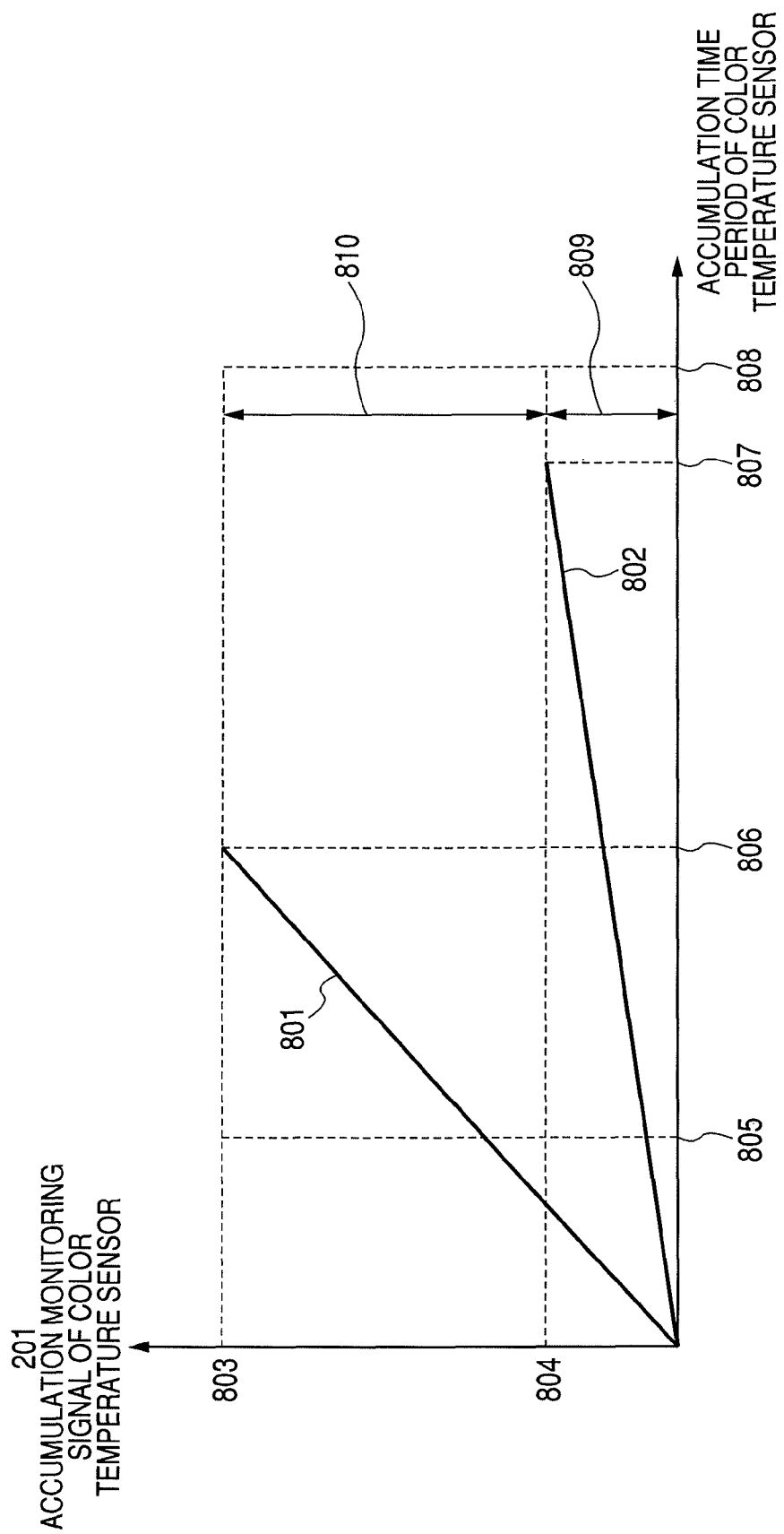
FIG. 8 is a conceptual diagram of an accumulation situation of a color temperature sensor illustrating the embodiment 3 of the invention.

FIG. 8 is a conceptual diagram of an accumulation situation of the color temperature sensor illustrating the embodiment 3 of the invention.

In FIG. 8, 801 and 802 show time-changes of the accumulation monitoring signal 201 of the color temperature sensor; 803 shows an accumulation comparing signal level in the low gain mode of the color temperature sensor; 804 shows an accumulation comparing signal level in the high gain mode of the color temperature sensor; 805 shows read-out gain change-over timing of the AF sensor; 806 shows accumulation end timing in the low gain mode of the color temperature sensor; 807 shows accumulation end timing in the high gain mode of the color temperature sensor; 808 shows accumulation end timing of the AF sensor; 809 shows a high gain mode of the color temperature sensor; and 810 shows a low gain mode of the color temperature sensor.

In the embodiment, a circuit construction is similar to that in the embodiment 2. In the signal process of the TG 107 for the color temperature sensor, the operation for making the accumulation control of the color temperature sensor 110 differs as illustrated in FIG. 3. As will be described hereinafter, a ratio of a gain value of the high gain read-out and a gain value of the low gain read-out of the AF sensor and that of the color temperature sensor are equalized.

The operation of the embodiment 3 will now be described with reference to FIGS. 3 and 8.

In the flowchart of FIG. 3, after the start of the accumulation of the color temperature sensor, STOP is set to 0. Subsequently, the read-out gain of the color temperature sensor is set to the high gain mode and the accumulation is monitored. If the accumulation of the AF is finished during the accumulation in the high gain mode, the color temperature sensor also finishes the accumulation and the signal is read out at the high gain. If the read-out gain of the AF is set to the low gain mode during the accumulation, STOP is set to 1. When the accumulation progresses and the comparator 610 is inverted, a value of STOP is checked. If STOP is equal to 1, the accumulation is finished and the signal is read out at the high gain. If STOP is equal to 0, the color temperature sensor is set to the low gain mode and continues the accumulation. If the accumulation of the AF is finished during the accumulation in the low gain mode, the color temperature sensor also finishes the accumulation and reads out the signal at the low gain. When the accumulation progresses and the comparator 610 is inverted, the color temperature sensor finishes the accumulation and reads out the signal at the low gain.

In a conceptual diagram of FIG. 8, the time-dependent changes of the accumulation monitoring signal 201 of the color temperature sensor under two kinds of light irradiating conditions are illustrated. A case where the accumulation monitoring signal 201 reaches the accumulation comparing signal level 804 in the high gain mode of the color temperature sensor until the AF sensor read-out gain change-over timing 805 is illustrated by the color temperature sensor photocurrent 801 of a large current. A case where the accumulation monitoring signal 201 of the color temperature sensor does not reach the accumulation comparing signal level 804 in the high gain mode of the color temperature sensor until the AF sensor read-out gain change-over timing 805 is illustrated by the color temperature sensor photocurrent 802 of a small current.

At the AF sensor read-out gain change-over timing 805, the accumulation of the color temperature sensor photocurrent 801 is continued as it is and the signal is read out in the low gain mode. Even if the comparator 610 is inverted for a period of time from the AF sensor read-out gain change-over timing 805 to the AF sensor accumulation end timing 808, the accumulation of the color temperature sensor photocurrent 802 is finished without setting the mode to the low gain mode and the signal is read out at the high gain.

In the embodiment, a ratio of the high gain read-out gain value and the low gain read-out gain value of the AF sensor and that of the color temperature sensor are equalized as mentioned above. That is, it is assumed that like a color temperature sensor photocurrent 801, the accumulation monitoring signal 201 of the color temperature sensor has reached the accumulation comparing signal level 804 in the high gain mode of the color temperature sensor at the AF sensor read-out gain change-over timing 805. If the signal 201 has reached the level 804, it will be understood that the color temperature sensor accumulation monitoring signal 201 certainly reaches the accumulation comparing signal level 803 in the low gain mode of the color temperature sensor until the AF sensor accumulation end timing 808.

Similarly, it is assumed that like a color temperature sensor photocurrent 802, the accumulation monitoring signal 201 of the color temperature sensor does not reach the accumulation comparing signal level 804 in the high gain mode of the color temperature sensor at the AF sensor read-out gain change-over timing 805. If the signal 201 does not reach the level 804, it will be understood that the color temperature sensor accumulation monitoring signal 201 does not reach the accumulation comparing signal level 803 in the low gain mode of the color temperature sensor until the AF sensor accumulation end timing 808. Therefore, in the color temperature sensor photocurrent 802, "1" is set into STOP in the timing of the AF sensor read-out gain change-over timing 805. In this manner, when the accumulation monitoring signal 201 of the color temperature sensor reaches the accumulation comparing signal level 804 in the high gain mode of the color temperature sensor for the period of time between the AF sensor read-out gain change-over timing 805 and the AF sensor accumulation end timing 808, the accumulation of the color temperature sensor is finished. Thus, even if the AF sensor finished the accumulation just after the color temperature sensor had been set to the low gain mode, the signal is read out at the high gain. Therefore, the output amplitude of the color temperature sensor can be increased.

Embodiment 4

Figure 4:
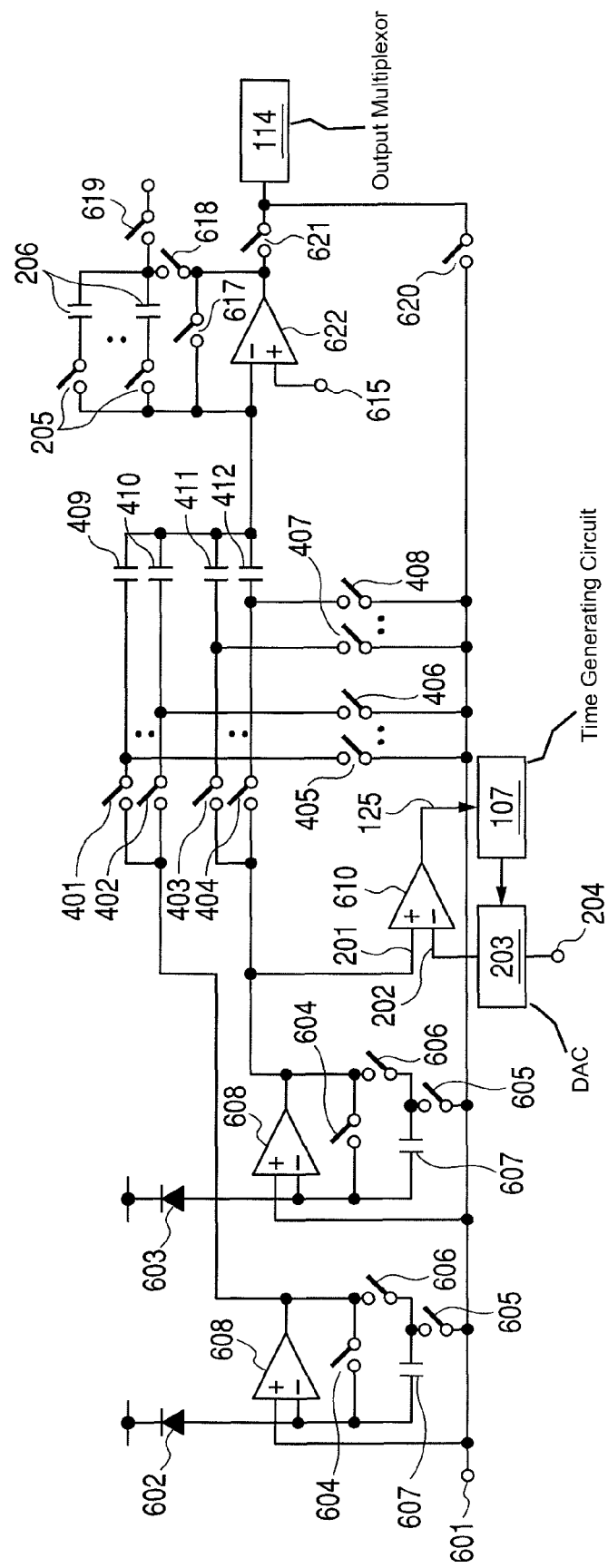
FIG. 4 is a circuit diagram of a color temperature sensor illustrating the embodiment 4 of the invention.

FIG. 4 is a circuit diagram of a color temperature sensor illustrating the embodiment 4 of the invention.

In this embodiment, in the color temperature sensor, each pixel has a plurality of accumulation signal holding units. The accumulation signal is held in the holding units in a timing when the color temperature sensor sets the gain again and timing when the color temperature sensor finishes the accumulation. The held signal and a gain setting at the signal holding timing are combined and output.

In FIG. 4, the following switches are provided: a switch 401 for transferring the signal read out of the R pixel in the high gain mode to the capacitor; a switch 402 for transferring the signal in the low gain mode of the R pixel to the capacitor; a switch 403 for transferring the signal in the high gain mode of the W pixel to the capacitor; a switch 404 for transferring the signal in the low gain mode of the W pixel to the capacitor; a switch 405 for reading out the signal in the high gain mode of the R pixel to the outside; a switch 406 for reading out the signal in the low gain mode of the R pixel to the outside; a switch 407 for reading out the signal in the high gain mode of the W pixel to the outside; and a switch 408 for reading out the signal in the low gain mode of the W pixel to the outside.

The following capacitors are provided: a capacitor 409 for holding the signal transferred by the switch 401; a capacitor 410 for holding the signal transferred by the switch 402; a capacitor 411 for holding the signal transferred by the switch 403; and a capacitor 412 for holding the signal transferred by the switch 404.

In the embodiment 4, circuit constructions other than the construction of the color temperature sensor are similar to those in the embodiment 2. Each of the switches 401 to 408 is driven by the TG 107 for the color temperature sensor.

The operation of the embodiment 4 will now be described with reference to FIG. 4.

The color temperature sensor starts the read-out operation in the high gain mode. When the accumulation progresses and the comparator 610 is inverted, the switches 401 and 403 are turned off. The accumulation signal upon inversion is held in the capacitors 409 and 411. After that, the mode is set to the low gain mode and the accumulation is continued. When the comparator 610 is inverted again, the switches 402 and 404 are turned off and the accumulation signal is held in the capacitors 410 and 412. However, in a manner similar to the embodiment 1, when the accumulation of the AF sensor is finished during the accumulation of the color temperature sensor, the accumulation of the color temperature sensor is finished.

In the embodiment 4, at the time of the read-out of the color temperature sensor, the holding signal which is read out and the gain can be selected according to the accumulation end situation of the color temperature sensor. For example, if the color temperature sensor finished the accumulation earlier than the AF sensor, the signal is read out of the color temperature sensor in the low gain mode. If the accumulation end of the AF sensor is determined and, at the same time, the accumulation of the color temperature sensor is also finished, the signal is read out of the color temperature sensor in the high gain mode. By using such a method, even if the AF sensor finished the accumulation just after the color temperature sensor had been set to the low gain mode as mentioned above, the output amplitude of the color temperature sensor can be increased.

Embodiment 5

The embodiments 1 to 4 have been described above on the assumption that the gain of reach of the AF sensor and the color temperature sensor is set to two kinds of gains such as high gain and low gain. In the embodiment 5, the number of gains which are set is increased and steps are made fine. By this method, since an opportunity of reading out the signal at a lower gain increases, the improvement of the S/N ratio can be expected.

Embodiment 6

Figure 9:
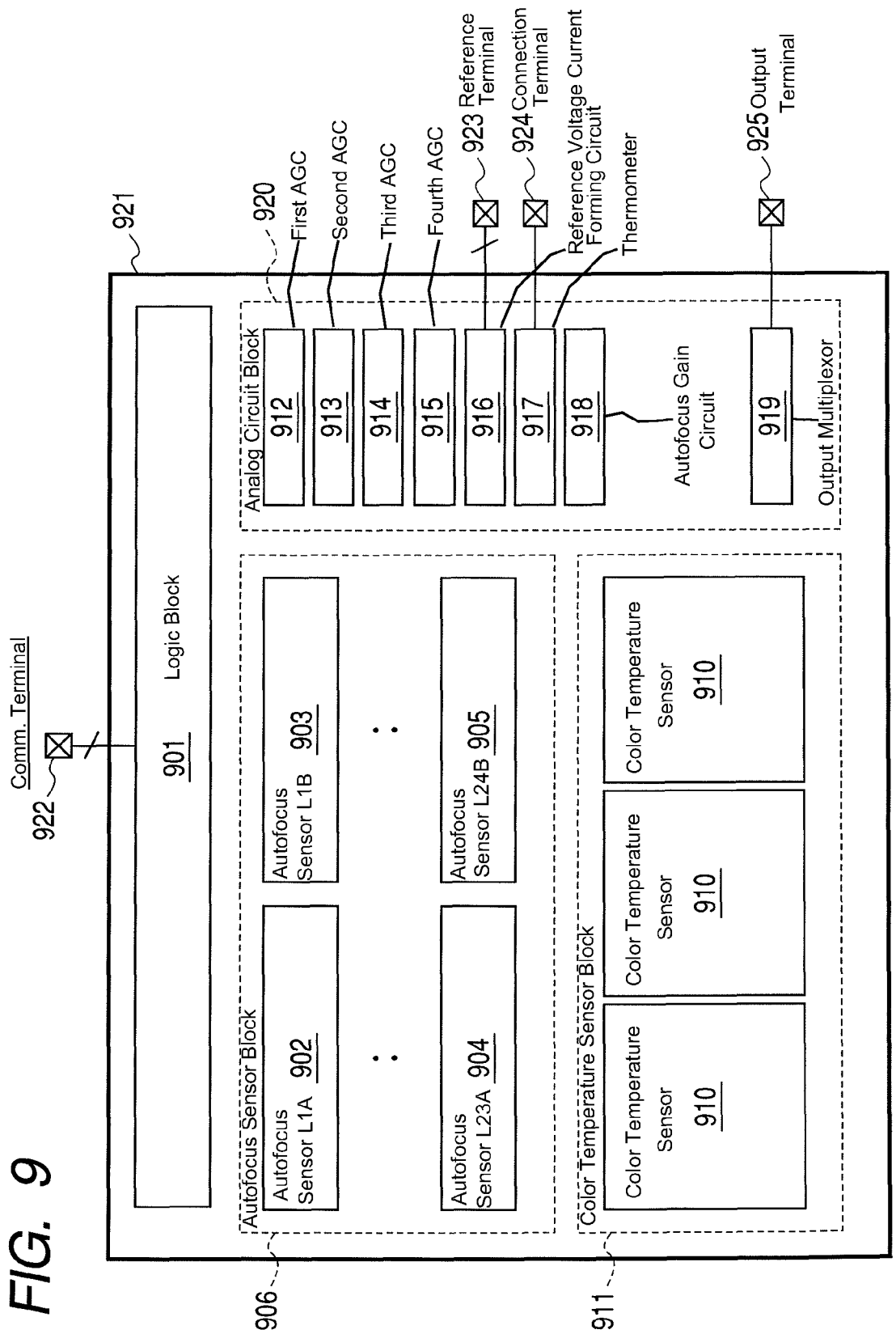
FIG. 9 is a block diagram of an integrating circuit illustrating the embodiment 6 of the invention.

FIG. 9 illustrates an integrating circuit which is used in a focus detection device having the AF sensors and color temperature sensors in the embodiments 1 to 5 of the invention.

In FIG. 9, a logic block 901 similar to the logic block 109 corresponds to a plurality of AF sensors and a plurality of color temperature sensors. An AF sensor L1A 902 is constructed by tens of pixel arrays. An AF sensor L1B 903 corresponds to one distance measuring point together with the AF sensor L1A 902. An AF sensor L23A 904, an AF sensor L24B 905, and an AF sensor block 906 are provided.

There are provided: color temperature sensors 910; a color temperature sensor block 911; a first AGC circuit 912; a second AGC circuit 913; a third AGC circuit 914; and a fourth AGC circuit 915. Maximum and minimum signals of the 23 pairs of AF sensors are time-divisionally transmitted to the first to fourth AGC circuits 912 to 915. Since each AGC circuit sequentially makes the accumulation control, the number of AGC circuits is reduced. There are also provided: a reference voltage current forming circuit 916; a thermometer circuit 917; an AF gain circuit 918; an output multiplexer 919; and an analog circuit block 920.

There are also provided: an integrating circuit 921 which is used in the focus detection device; a serial communication terminal 922 of the input terminals 101 to 103; a reference voltage output terminal 923; a diode connection terminal 924 for an external thermometer; and an analog signal output terminal 925.

Although line connection information is not illustrated in FIG. 9, the logic block 901 controls the circuits in each of the blocks 906, 911, and 920 by external serial communication. Signals of the AF sensor block 906 are accumulation-controlled by the first to fourth AGC circuits 912 to 915. An accumulation completion signal is transferred to the logic block 901. The signals of the AF sensor block 906 are amplified by the AF gain circuit 918 and taken out of the analog signal output terminal 925 through the output multiplexer 919 while including signals of the color temperature sensor block 911. A reference voltage and a reference current which are formed by the reference voltage current forming circuit 916 are supplied to each of the blocks 901, 906, 911, and 920. A part of the signals can be taken out of the serial communication terminal 922 or taken out of the analog signal output terminal 925 through the output multiplexer 919.

In the embodiment, the number of color temperature sensors is smaller than the number of AF sensors and distance measuring points of a plurality of AF sensors are covered by one color temperature sensor. In this case, accumulation situations of a plurality of AF sensors which is covered by one color temperature sensor or an accumulation situation of the AF sensor in which an increasing speed of a difference between the maximum and minimum values of the accumulation signal is lowest among all of the AF sensors is reflected to the color temperature sensor. For example, if the AF sensor whose accumulation is latest finished the accumulation, the accumulation of the color temperature sensor is finished. At timing when the AF sensor in whose accumulation is latest switches the gain setting, the color temperature sensor decides the read-out gain (embodiment 3) or the accumulation signal is held in the holding capacitor (embodiment 4). This is because the arithmetic operation for the focus detection is executed after all of the AF sensors finished the accumulation. By matching the accumulation time period of the color temperature sensor with that of the AF sensor whose accumulation is latest, the accumulation time period of the color temperature sensor is extended as long as possible, thereby improving the S/N ratio.

Embodiment 7

Figure 10:
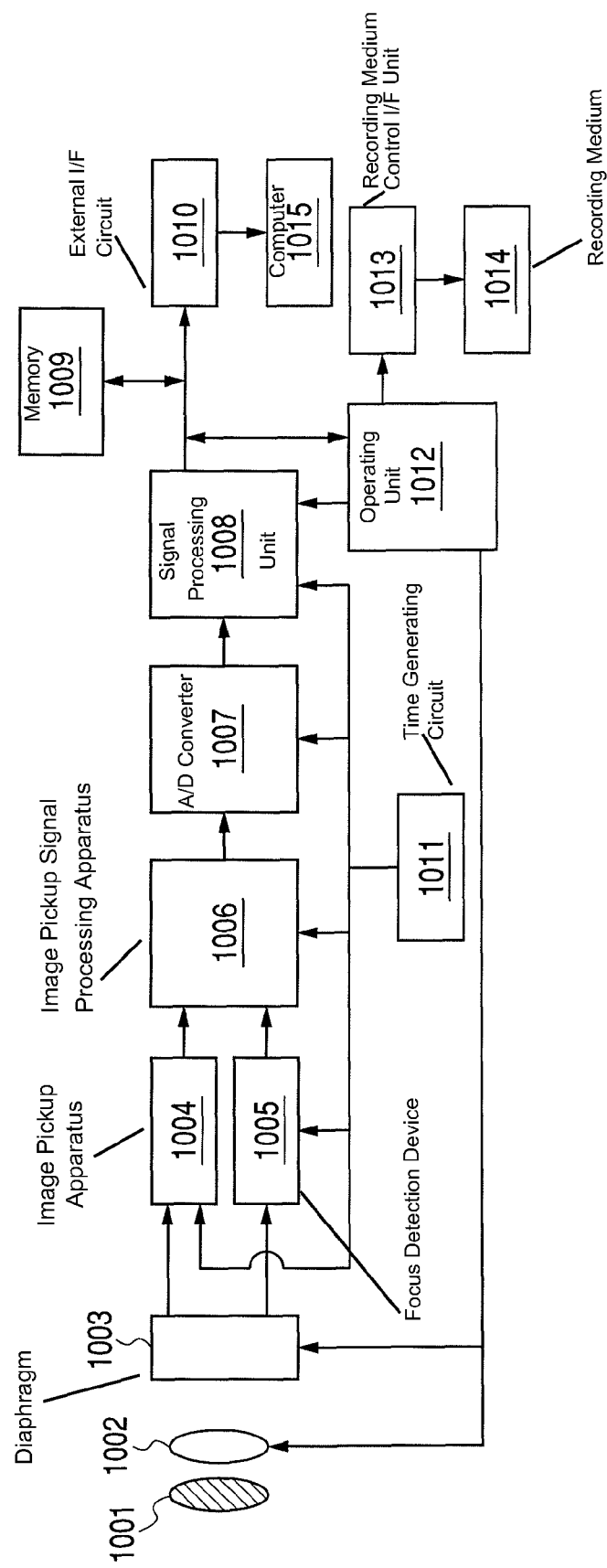
FIG. 10 is a block diagram of a camera system illustrating the embodiment 7 of the invention.

FIG. 10 is a constructional diagram of a camera system illustrating the embodiment 7 of the invention.

The embodiment relates to the system obtained by assembling the focus detection device of the invention into a digital camera.

A barrier 1001 functions as both of a device to protect a lens and a main switch, which will be described hereinafter. An optical image of the object is formed onto a solid-state image pickup device through a lens 1002. A diaphragm 1003 is provided to adjust an amount of light which has passed through the lens. A solid-state image pickup apparatus 1004 fetches the object, as an image signal, whose image has been formed by the lens. A focus detection device 1005 in which the AF sensor and the color temperature sensor disclosed in the embodiment 1 or 2 or the integrating circuit in the embodiment 3 has been mounted is provided.

An image pickup signal processing apparatus 1006 processes the signal which is output from the solid-state image pickup device or the focus detection device. An A/D (analog-to-digital) converter 1007 converts an analog signal output from the image pickup signal processing circuit into a digital signal. A signal processing unit 1008 makes various corrections to image data output from the A/D converter or compresses the data.

A memory unit 1009 temporarily stores the image data. An external I/F circuit 1010 is provided to communicate with an external computer or the like. A timing generating unit 1011 generates various timing signals to the signal processing unit and the like. A whole control/arithmetic operating unit 1012 executes various arithmetic operations and controls the whole camera. There are also provided: a recording medium control I/F unit 1013; a detachable recording medium 1014 such as a semiconductor memory or the like for recording or reading out data; and an external computer 1015.

The operation which is executed upon photographing of the digital camera will now be described.

When the barrier 1001 is opened, a main power source is turned on and a power source of a control system is subsequently turned on. Further, a power source of an image pickup system circuit such as A/D converter 1007 or the like is turned on. Then, based on the signal output from the focus detection device, the whole control/arithmetic operating unit 1012 arithmetically operates a distance to the object by the phase difference detection as mentioned above. After that, the lens 1002 is driven and whether or not an in-focus state has been obtained is discriminated. If it is determined that the in-focus state is not obtained, the lens 1002 is again driven and auto-focus control is made in this manner. Subsequently, after the in-focus state is confirmed, a main exposure is started. When the exposure is finished, the analog image signal output from the solid-state image pickup apparatus 1004 is converted into a digital signal by the A/D converter 1007. The digital signal passes through the signal processing unit 1008 and is written into the memory unit 1009 by the whole control and arithmetic operation. After that, the data stored in the memory unit 1009 passes through the recording medium control I/F unit 1013 by the control of the whole control/arithmetic operating unit 1012 and is recorded into the detachable recording medium 1014. The data may be transmitted through the external I/F circuit 1010 and directly input to the computer or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-047195, filed Feb. 27, 2007, which is hereby incorporated by reference herein in its entirety.

What is claimed is:

1. A focus detection device comprising:
   a first sensor for outputting a signal for focus detection based on a phase difference detection; and
   a second sensor having a plurality of pixels of mutually different spectral sensitivities,
   wherein the first and second sensors have different accumulation start timings,
   wherein the first sensor controls a length of an accumulation time period based on a difference between maximum and minimum values of the signal outputted from the first sensor, and
   wherein the second sensor terminates an accumulation time period thereof based on an accumulation end signal resulting from a termination of the accumulation time period of the first sensor.

2. The focus detection device according to claim 1, wherein the second sensor determines the accumulation time period and a reading out gain thereof based on the maximum value of accumulation signals of respective pixels.

3. The focus detection device according to claim 2, wherein the second sensor determines the reading out gain thereof at a timing of resetting of reading out gain of the first sensor.

4. The focus detection device according to claim 2, wherein the second sensor has a plurality of accumulation signal holding units for each of the pixels of the second sensor, to hold signals of the second sensor by a trigger of a timing of resetting the gain of the second sensor, or by a trigger of a timing of terminating the accumulation by the second sensor, and to output the signal held in the plurality of accumulation signal holding units and a gain setting at a timing of the holding in the plurality of accumulation signal holding units.

5. The focus detection device according to claim 1, wherein a plurality of the first sensor is provided, and
wherein the second sensor terminates the signal accumulation at a timing of terminating accumulation of a sensor, among the plurality of the first sensor, of which a speed of increasing a difference between the maximum and minimum values of an accumulation signal of that sensor is minimum.

6. The focus detection device according to claim 3, wherein a plurality of the first sensor is provided, and
wherein the second sensor determines the reading out gain thereof at a timing of resetting of reading out gain of a sensor, among the plurality of the first sensor, of which a speed of increasing a difference between the maximum and minimum values of an accumulation signal of that sensor is minimum.

7. A camera system comprising the focus detection device according to claim 1.

8. A focus detection device comprising:
a first sensor for outputting a signal for focus detection based on a phase difference detection; and
a second sensor having a plurality of pixels of mutually different spectral sensitivities and operative to switch between a high gain mode and a low gain mode,
wherein an accumulation operation by the second sensor is started with the high gain mode after an accumulation operation by the first sensor is started,
wherein the first sensor is operative to control an accumulation time period based on a difference between maximum and minimum values of an accumulation signal and switch a read-out gain between the high gain mode and the low gain mode based on the difference between the maximum and minimum values of the accumulation signal,
wherein before the accumulation by the first sensor ends, if an accumulation signal of the second sensor exceeds a predetermined value causing the accumulation to be terminated by the second sensor, then the accumulation is terminated if the first sensor is in the low gain mode even if the second sensor is in the high gain mode, while the accumulation is terminated with the second sensor being set to the low gain mode if the first sensor is in the high gain mode, and
wherein when the accumulation by the first sensor ends, if the accumulation by the second sensor is not terminated by the second sensor, then the accumulation by the second sensor is terminated by a trigger of an accumulation end signal of the first sensor.

9. The focus detection device according to claim 8, wherein the second sensor controls the read-out gain of the accumulation time period based on the maximum value of the accumulation signal of each pixel.

10. The focus detection device according to claim 9, wherein the second sensor terminates the accumulation according to a mode of the read-out gain of the first sensor, or changes the read-out gain to perform the accumulation.

11. The focus detection device according to claim 9, wherein the second sensor comprises a plurality of accumulation signal holding units for each pixel, holds the accumulation signal at a timing at which the second sensor resets the gain and a timing at which the second sensor terminates the accumulation, and combines and outputs the signal held in the plurality of accumulation signal holding units and a gain setting at a timing of the holding by the plurality of accumulation signal holding units.

12. The focus detection device according to claim 8, wherein a plurality of the first sensor is provided, and
wherein the second sensor terminates signal accumulation at a timing of terminating an accumulation of a sensor, among the plurality of the first sensor, whose increasing speed of a difference between maximum and minimum values of an accumulation signal is minimum.

13. The focus detection device according to claim 10, wherein a plurality of the first sensor is provided, and
wherein the second sensor terminates the accumulation or changes the read-out gain to perform the accumulation according to a mode of a read-out gain of a sensor, among the plurality of the first sensor, whose increasing speed of a difference between maximum and minimum values of an accumulation signal is minimum.

14. A camera system comprising the focus detection device according to claim 8.

* * * * *